United States Patent

Curry

[15] 3,683,288

[45] Aug. 8, 1972

[54] FREQUENCY MODULATION DEMODULATOR

[72] Inventor: Joseph E. Curry, Houston, Tex.

[73] Assignee: Texas Instruments Incorporated, Dallas, Tex.

[22] Filed: July 31, 1970

[21] Appl. No.: 59,890

[52] U.S. Cl. ..................329/104, 307/232, 307/269, 328/63, 328/110, 340/174.1 H

[51] Int. Cl. ..............................................H03k 9/00

[58] Field of Search...340/174.1 G, 174.1 A; 328/63, 328/109, 110, 72, 201; 329/104, 107, 110; 307/232, 269

[56] References Cited

UNITED STATES PATENTS

| | | | |
|---|---|---|---|
| 3,560,860 | 2/1971 | Gueldenpfennig | 307/269 X |
| 3,423,744 | 1/1969 | Gerlach et al. | 340/174.1 G |
| 3,114,109 | 12/1963 | Melas | 328/63 |
| 3,382,492 | 5/1968 | Santana | 340/174.1 G |
| 3,331,079 | 7/1967 | Reader | 340/174.1 G |

*Primary Examiner*—Alfred L. Brody
*Attorney*—Harold Levine, James O. Dixon, Andrew M. Hassell, Melvin Sharp, Rene' E. Grossman and James T. Comfort

[57] ABSTRACT

A self-clocking system for extracting from a composite signal, data and clock signal separation in a frequency modulation data system. The clock signal is separated from the data signal in order to use it to clock the data into and/or out of registers and other elements in the system. The demodulator system contains a synchronized multivibrator or other oscillator which tracks with any reasonable change in character or frequency of the composite frequency modulated signal generated, for example, from a recording medium such as a magnetic disc, drum or tape. If the frequency changes, or a clock pulse is not present for one bit cell, the multivibrator or oscillator maintains the integrity of the signals on the demodulator outputs and by coupling the multivibrator or other oscillator output to a flip-flop and further coupling the outputs of the flip-flop to appropriate logic circuitry, clock and data separation is thereby obtained.

10 Claims, 5 Drawing Figures

| A | B | C |
|---|---|---|
| 1 | 1 | 0 |
| 0 | 0 | 1 |
| 1 | 0 | 1 |
| 0 | 1 | 1 |

FREQUENCY MODULATION DEMODULATOR

This invention relates to demodulators and more particularly to a self-clocking frequency modulation demodulator for separating two signals from a composite signal.

Heretofore previous demodulator systems have incorporated circuits that lacked the flexibility required to meet the changing conditions and characteristics exhibited in all recording mediums, such as magnetic discs, drums or tapes. These changing conditions and characteristics are brought about by changing temperature conditions, variations in surface velocity, vibrations, unstable signal generating mediums and devices, aging of electronic and mechanical components, defects in recording surfaces, pulse crowding, peak shifting, and other numerous causes. All of these factors produce instabilities in frequency of the signals recorded and/or played back from the recorded medium.

The fixed or rigid demodulator systems generally utilize some form of delay, either lumped constant, distributed constant, or otherwise to effect a delay of either the data or the clock portion of the composite frequency modulated signal. This fixed delay therefore cannot change to meet the requirements of the changing recorded signal. Consequently, these systems using rigid or fixed delays are not satisfactory for their intended purpose under all likely conditions encountered in the recording medium whereby on of the factors above-mentioned causes an instability in the frequency of the recorded signal.

Accordingly it is an object of this invention to produce a demodulator which is not fixed or rigid but remains synchronized with the incoming frequency modulated composite signal.

Another object of this invention is to provide a demodulator which separates from a composite signal data and clock information.

It is a further object of this invention to provide a self-clocking demodulator circuit which retrieves the data and clock signals from a composite signal despite variations of frequency of the composite signal.

It is still a further object of this invention to provide a simple, effective, efficient and economical frequency modulator demodulator.

For a more complete understanding of the present invention and for further objects and advantages thereof, reference is now made to the following description taken in conjunction with the accompanying drawings, in which.

Figure 1:
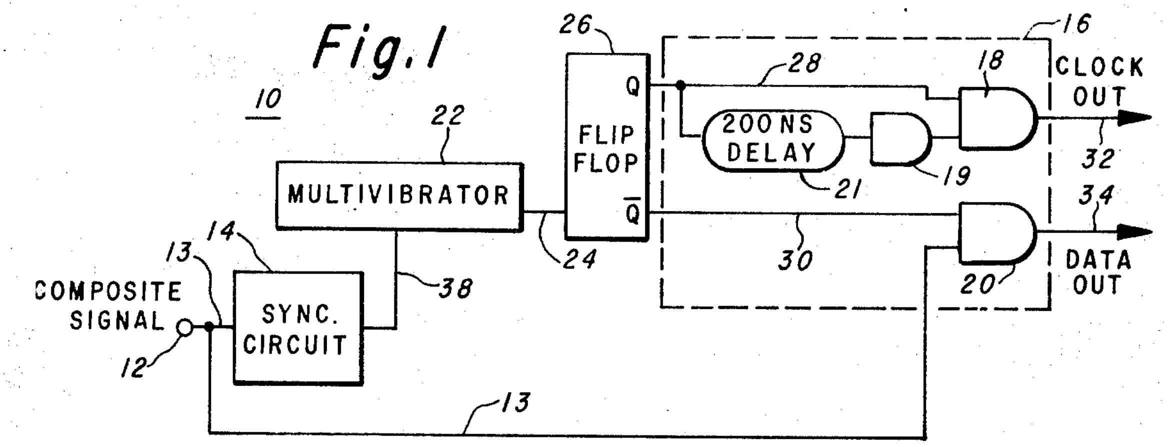
FIG. 1 is a block diagram representation of a demodulator according to the present invention.

Referring to FIG. 1, a demodulator system 10 according to the invention is illustrated. A composite signal is applied to terminal 12 which couples the composite signal via lead 13 to sync circuit 14 as well as to logic means 16. Logic means 16, by way of example, may be comprised of gates 18–20 and a delay unit 21 (illustrated as having a 200 nanosecond delay). Alternately, logic means 16 may be comprised of two flip-flops, an output from each flip-flop providing the clock or data signals. Sync circuit 14 is coupled to a square wave generating means which may be, by way of example, multivibrator or oscillator 22. The square wave output 24 of multivibrator 22 is coupled to a frequency dividing means which produces two out of phase signals at half the frequency of the square wave output 24. This frequency dividing means, in a preferred embodiment, may be a flip-flop 26 having a true output 28(Q) and a complement output 30 ($\bar{Q}$), said true and complement outputs being 180° out of phase. True output 28 is applied both to one of the inputs of gate 18 and to delay 21. The output from delay 21 is coupled to gate 19 which output is then applied to the second input of gate 18. The complement output 30($\bar{Q}$) from flip-flop 26 is coupled to the input of gate 20 while the composite signal applied to terminal 12 is coupled via lead 13 to the second input of gate 20. The output 32 from gate 18 may produce the clock signal while the output 34 from gate 20 may produce the data signal.

Figure 2:
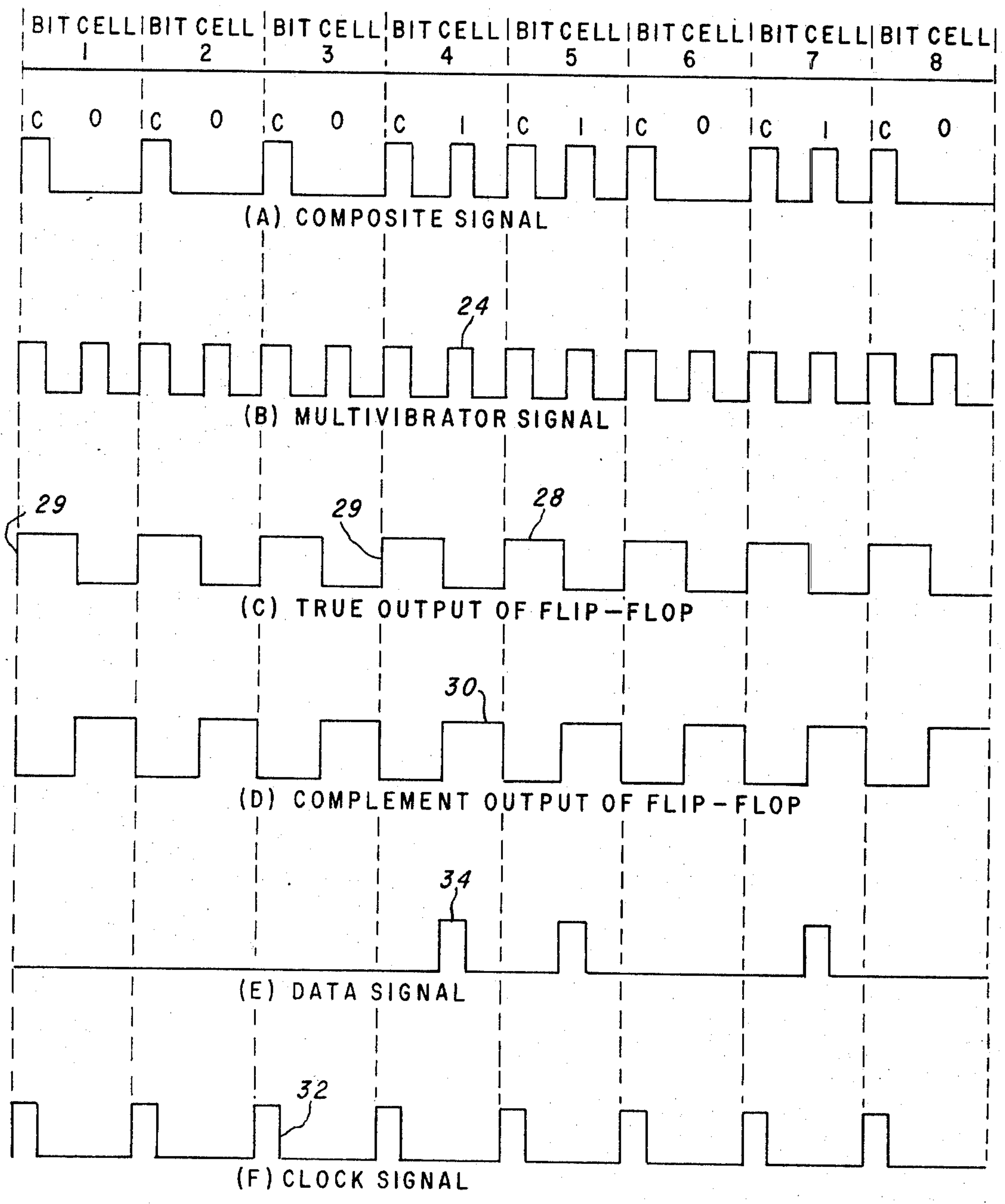
FIG. 2 illustrates a set of waveforms depicting the operation of the demodulator of FIG. 1.

In operation, the demodulator 10 of FIG. 1 will be described in conjunction with the waveforms illustrated in FIG. 2. The composite signal illustrated as FIG. 2A is a frequency modulated signal which is obtained from a recording or playback system and is comprised of at least two signals, a data signal and a clock signal. The data or information contained in the composite signal of FIG. 2A is 00011010, a logical "1" being designated by the presence of a pulse while a logical "0" being designated by the absence of a pulse. The clock pulses illustrated in FIG. 2A are indicated by a C above each clock pulse. Eight bit cells are illustrated in FIG. 2. A bit cell in this application is defined as the time between successive clock pulses or the time required to generate a clock plus data pulse.

The frequency modulated composite signal illustrated in FIG. 2A (and shown in more detail in FIG. 4A) is applied to the input of sync circuit 14 and, at the same time, applied to logic means 16. Multivibrator 22 generates a square wave output 24 illustrated in FIG. 2B. The multivibrator natural frequency is approximately equal to the data plus clock frequency. When the composite signal is applied to sync circuit 14, multivibrator 22 becomes synchronized with the composite signal in a manner to be described in more detail hereafter. It will be noted that even when no data is present in the composite signal (that is when only a clock signal is present, for example, as shown in bit cells 1–3), multivibrator 22 operates at the data plus clock frequency rate as illustrated in FIG. 2B. Only one pulse per bit cell need be present to assure exact synchronization with the data plus clock frequency rate of multivibrator 22.

The square wave output 24 from multivibrator 22 illustrated in FIG. 2B is applied to flip-flop 26 which divides by two the frequency of square wave output 24. Flip-flop 26 generates a true and complement output 28 and 30, respectively, which are 180° out of phase and, as mentioned hereinbefore, is one-half the frequency of the square wave output of multivibrator 22. The true and complement outputs of flip-flop 26 are illustrated in FIG. 2C and 2D, respectively. Flip-flop 26 is triggered by the square wave output from multivibrator 22. True output 28 and complement output 30 provide enabling signals to gates 18–20 in proper phase to allow separation of the composite signal into the clock output 32 from gate 18 and the data output 34 from gate 20.

The portion of logic means 16 connected to the true output 28 of flip-flop 26 assures that a clock pulse output be generated regardless of whether a clock pulse is present in the composite signal for that particular bit cell. It should be noted that the leading edge 29 of the true output 28 shown in FIG. 2C is in time coincidence with the leading edge of the clock pulse shown in the composite signal of FIG. 2A. This is assured by the fact that multivibrator 22 is synchronized by the composite signal through sync circuit 14 and the square wave output 24 from multivibrator 22 (shown in FIG. 2B) in turn triggers flip-flop 26. Gates 18 and 19 and delay unit 21 will generate a 200 nanosecond clock signal on output 32 at each occurrence of the leading edge 29 of the true output from flip-flop 26. This waveform is illustrated in FIG. 2F. When a logical "0" is present on true output 28 (just prior to bit cell 2, for example), this output is applied to gate 18 and also is applied 200 nanoseconds later by delay unit 21 to gate 19 which inverts the logical "0" to a logical "1." Accordingly the output from gate 18 is a logical "1." When the true output 28 goes from a logical "0" to a logical "1," this logical "1" is applied directly to the input of gate 18 which still has at its other input a logical "1" which causes gate 18 to generate a logical "0" out at lead 32. 200 nanoseconds later the logical "1" present at the true side 28 of flip-flop 26 passes through delay unit 21 which is inverted through gate 19 to a logical "0" which is coupled to the second input of gate 18. This causes the clock output 32 to return to a logical "1." As mentioned previously therefore, a clock pulse out of lead 32 is generated in time coincidence with each leading edge of true output 28 and the length of the clock pulse is determined by the amount of delay present in delay unit 21 (200 nanoseconds in this instance). Clock output 32 is applied to another inverter (not shown) which produces the signal as shown in FIG. 2F.

Figure 5:
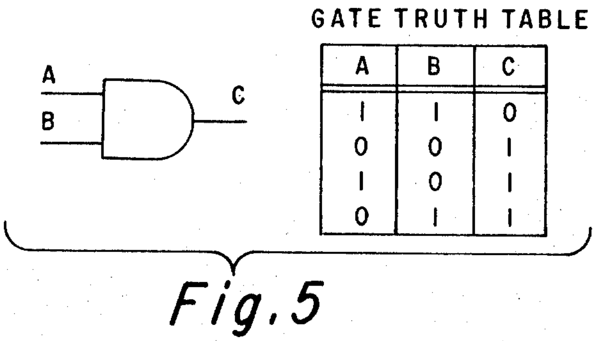
FIG. 5 represents the logic truth table for the gates utilized herein.

An alternate approach to generate the clock output from gate 18 would be to eliminate delay unit 21 and gate 19 and instead apply the composite signal directly to the second input to gate 18. In this alternate embodiment, during bit cell 1, for example, the true output 28 of flip-flop 26 is positive which "enables" gate 18 and allows the clock pulse present (see FIG. 2A) on the other input of gate 18 to appear on the output 32 of gate 18. As mentioned previously the clock output 32 from gate 18 would be applied to an inverter (not shown) to present a waveform identical to that shown in FIG. 2F. FIG. 5 describes the truth table for a typical gate utilized herein.

Also during the first half of bit cell 1, the complement output 30 of flip-flop 26 is a logical "0" which inhibits gate 20 thereby not allowing any component of the composite signal present on the other input of gate 20 to appear on the output 34 of gate 20. During the next half cycle of bit cell 1, true output 28 becomes a logic "0" and thereby inhibits gate 18 while complement output 30 goes positive (a logical "1") and enables gate 20. However since no data signal appears as an input to gate 20 during bit cell 1, even though complement output 30 enables gate 20, no data output appears as an output 34 from gate 20. The omission of a data output during bit cell 1 is illustrated in FIG. 2E. This sequence is repeated during bit cells 2 and 3.

During bit cell 4, a clock signal appears on the output 32 from gate 18 (as illustrated in FIG. 2F) in time coincidence with the leading edge 29 of true output 28 as described hereinbefore. When flip-flop 26 changes state during the next half cycle of bit cell 4, true output 28 is a logical "0" and inhibits gate 18 while complement output 30 is a logical "1" (positive) and enables gate 20. At this time, the composite signal illustrated in FIG. 2A contains a logical "1" at the data position and accordingly a data "1" passes through gate 20 and appears on the output 34 of gate 20 and is illustrated in FIG. 2E as a logical "1." The above operations are repeated for bit cells 5–8.

Figure 3:
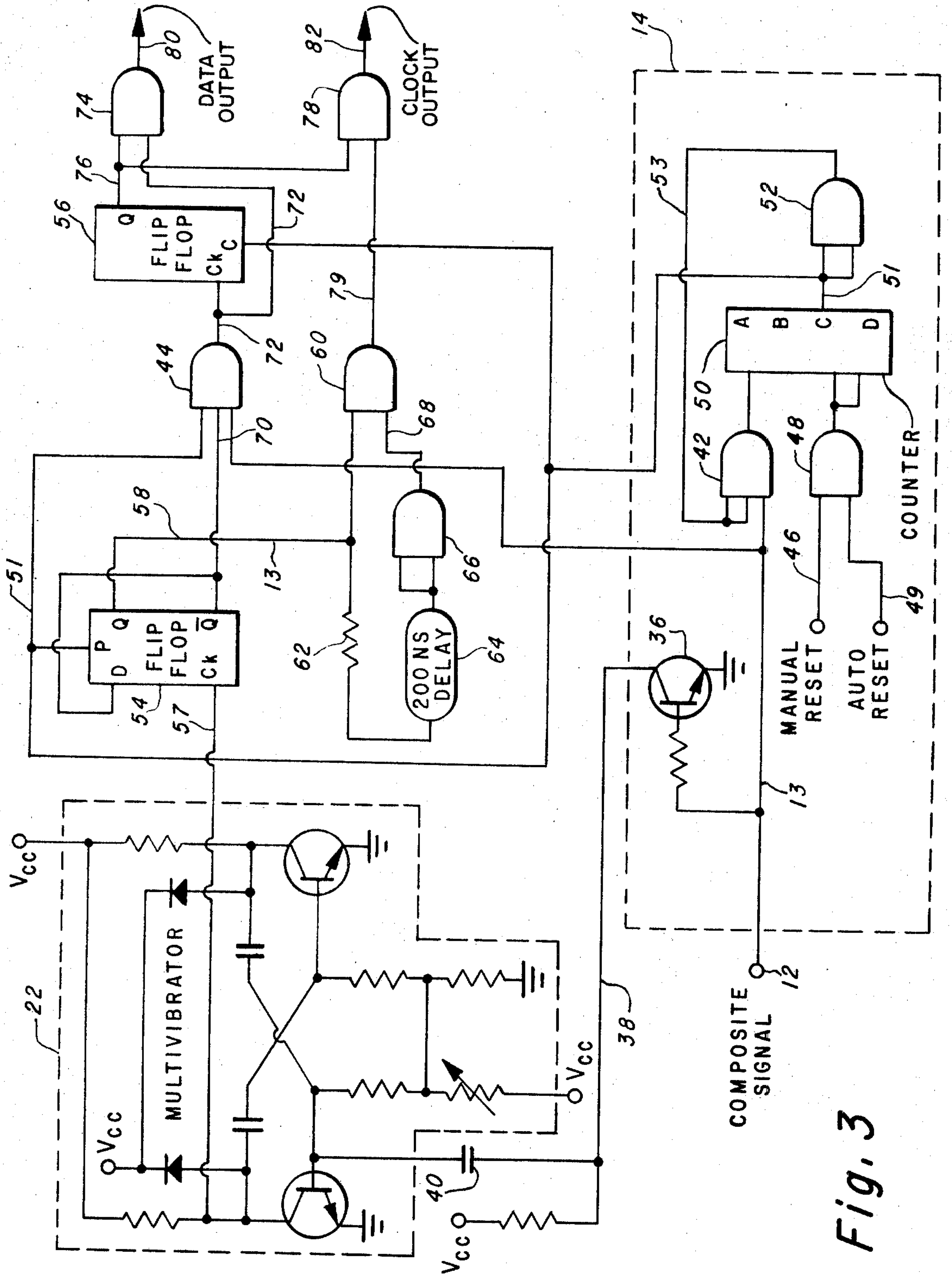
FIG. 3 is a detailed schematic of the demodulator system.

Referring now to FIG. 3, a detailed schematic of the demodulator 10 according to the invention is illustrated. The composite signal is applied to terminal 12 which is coupled by way of transistor amplifier-inverter 36 to multivibrator 22, by way of lead 38. Lead 38 is connected to capacitor 40 which is coupled to one side of multivibrator 22. *Vcc* represents the bias voltage for the various components in demodulator 10. Multivibrator 22, although illustrated schematically, is a standard multivibrator and accordingly operates in a manner which is well known. The composite signal is also applied by lead 13 to one input of stop gate 42 as well as to one input of gate 44. A manual reset pulse is coupled by lead 46 to one of the inputs of gate 48. An auto reset pulse is applied by way of lead 49 to the other input of gate 48. The output of gate 48 is applied to the reset position of a four-bit binary counter 50 having four outputs A–D. The output of gate 42 is also applied to the input of counter 50. Output C is applied by lead 51 to inverter gate 52 and the output 53 of the inverter gate 52 is applied as the second input to stop gate 42. Lead 51 is connected also as one of the inputs to gate 44 as well as to the preset(P) side of flip-flop 54 and further to the clear(C) side of flip-flop 56. Flip-flops 54 and 56 may comprise, for instance, a SN7400 package manufactured and sold by Texas Instruments Incorporated. The clock lead 57(Ck.) of flip-flop 54 is connected to one side of multivibrator 22. The Q side (true side) of flip-flop 54 is connected by way of lead 58 to one input of gate 60 (which corresponds to gate 18, FIG. 1) and also through resistor 62 to 200 nanosecond delay unit 64. The output of delay unit 64 is coupled to gate 66. The output lead 68 from gate 66 supplies the second input to gate 60. The output lead 70 from the $\overline{Q}$ side (complement side) of flip-flop 54 is applied to the third input of gate 44 as well as back to the D input of flip-flop 54. The output lead 72 from gate 44 is applied to the clock (Ck.) input of flip-flop 56 as well as to one input of gate 74. The lead 76 from the Q side of flip-flop 56 is applied to the second input to gate 74 as well as to an input of gate 78. The output 79 from gate 60 is applied as the second input to gate 78. Leads 80 and 82 provide the data and clock signals illustrated in FIG. 2E and 2F, respectively. All gates, except gates 42 and 44, may comprise, for instance, a SN7400 package manufactured and sold by Texas Instruments Incorporated. The truth table for these gates is illustrated in FIG. 5.

Gates 42 and 44 may be a SN74 H 11 and SN7410, respectively.

Figure 4:
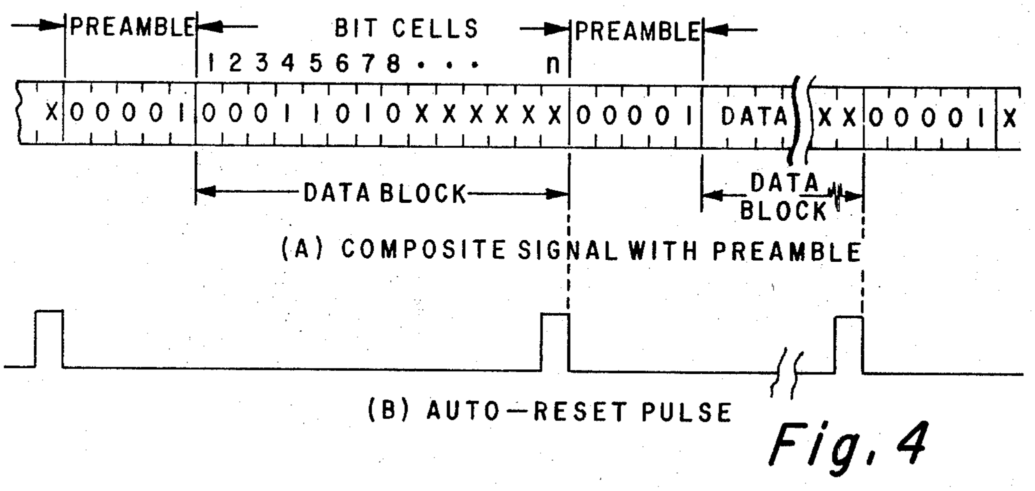
FIG. 4 illustrates additional waveforms pertinent to the operation of the detailed schematic of FIG. 3.

The operation of the invention illustrated in FIG. 3 will be described in conjunction with the waveforms illustrated in FIGS. 2 and 4. The block of data shown in FIG. 2A is preceded by a preamble which allows the entire demodulator 10 to identify the data block and synchronize in the proper phase. This preamble is illustrated in FIG. 4A. For the circuit shown in FIG. 3, the preamble must have at least four logical "0" followed by a logical "1." This is shown in FIG. 4A as well as the data bit cells following the preamble which correspond to the bit cell information shown in more detail in FIG. 2A. The preamble is repeated after each block of data. At the end of a data block, i.e., just before the preamble, an auto reset signal is generated elsewhere (not shown) as illustrated in FIG. 4B.

In operation, just prior to starting the demodulator, a manual reset pulse is applied to gate 48 which sets counter 50 to the "0" state. As the composite signal is applied to terminal 12, multivibrator 22 immediately synchronizes with it; that is, the multivibrator 22 synchronizes with the clock and data pulses of the composite signal as illustrated in FIG. 2B. Because the composite signal is providing the synchronization for the multivibrator, the multivibrator will remain synchronized therewith regardless of changes in frequency due to factors before mentioned. The preamble (illustrated in FIG. 4A) precedes through stop gate 42 to counter 50. As the four zeros of the preamble are applied to counter 50, the counter will stop its count on the count of 4 which inhibits stop gate 42 and stops further pulses of the preamble and composite signal from entering counter 50. On the count of 4, output C of counter 50 changes from ground (a logical "O," which has inhibited flip-flops 54 and 56 and gate 44) to a positive level (a logical "1"). Flip-flops 54 and 56 were inhibited until the fourth count of counter 50 as output C (then a logical "O") was applied to the preset side of flip-flop 54 and to the clear side of flip-flop 56. The ground level (logical "0" ) on the preset input sets the Q side of flip-flop 54 to a logical "1" while the ground level (logical "O") input to the clear side of flip-flop 56 sets the Q side of flip-flop 56 to a logical "O" thereby inhibiting gate 74 and 78. The ground level applied by lead 51 to gate 44 also inhibits that gate during the first 4 counts of counter 40. As mentioned previously when on the count of 4 counter 50 changes from a ground level to a positive level, i.e., a logical "1," this positive level enables flip-flop 54 and 56 and also gate 44.

The next and last digit of the preamble is a logical "1." Since stop gate 42 is inhibited, this logical "1" precedes through now enabled gate 44 and sets flip-flop 56 through lead 72. When flip-flop 56 is set by the logical "1" pulse from the preamble, the Q output 56 from flip-flop 56 becomes a logical "1" thereby enabling gates 74 and 78.

At the end of the preamble, the data block (shown in FIG. 4A) is then applied to multivibrator 22 and to gate 44. Multivibrator 22 is synchronized by the composite signal and the output from multivibrator 22 is applied by lead 57 to flip-flop 54. The $\bar{Q}$ side of flip-flop 54 and the composite signal are logically combined in gate 44 in a manner as described with regard to gate 20 in FIG. 1. The output 72 of gate 44 is passed through "enabled" inverting gate 74 and the resulting data illustrated in FIG. 2E.

The clock output 82 is generated from the Q side (the true side) of flip-flop 54 through delay unit 64 and gates 66,60 and 78 in a manner similar to that described with regard to FIG. 1. At the end of a data block, an auto reset signal (illustrated in FIG. 4B) is generated and is applied to gate 48 through lead 49. This auto reset pulse resets counter 50 to the "0" state and prepares demodulator 10 for the next preamble.

Although the present invention has been shown and illustrated in terms of a specific apparatus, it will be apparent that changes or modifications can be made without departing from the spirit and scope of the invention as defined by the appended claims.

What is claimed is:

1. A demodulator for separating from a composite signal a first and second signal, comprising:

square wave generating means for producing a square wave output at a frequency approximately equal to the sum of the frequency of said first plus said second signals, means for synchronizing said square wave output with said composite signal, frequency dividing means coupled to said square wave generating means for producing two out of phase signals at half the frequency of said square wave output, and logic means for combining said out of phase signals with said composite signal to produce separate first and second signals.

2. A demodulator for separating from a composite signal first and second signals, comprising:

square wave generating means for producing a square wave output at a frequency approximately equal to the sum of the frequency of the first plus second signals, synchronizing means connected to said square wave generating means having as an input said composite signal for synchronizing said square wave output with said composite signal, frequency dividing means coupled to said square wave generating means for producing two out of phase signals at half the frequency of said square wave output, and logic means for combining said two out of phase signals with said composite signal to produce separate first and second signals.

3. A demodulator according to claim 2 wherein said square wave generating means is a multivibrator.

4. A demodulator according to claim 2 wherein said logic means comprise two gates, one of said gates having as its inputs one of said out of phase signals and the same out of phase signal delayed and the other gate having as its inputs the composite signal and the other of said out of phase signals.

5. A demodulator according to claim 2 wherein said two out of phase signals are out of phase by 180°.

6. A demodulator for separating from a composite signal the data and clock signals, comprising:

means for generating a square wave output at a frequency approximately equal to the sum of the frequency of the data plus clock signals, synchronizing means connected to said square wave generating means having as an input said composite signal for synchronizing said square wave output with said composite signal, flip-flop means coupled to said square wave generating means for generating a true and complement output at half the frequency of said square wave output, and logic means for combining said composite signal with said true and complement outputs to produce separate data and clock signals.

7. A demodulator according to claim 6 wherein said square wave generating means is a multivibrator.

8. A demodulator according to claim 6 wherein said logic means comprise two gates, one of said gates having as an input said true output while said second gate has as its inputs the composite signal and the complement output.

9. A demodulator according to claim 6 wherein said logic means comprise two flip-flops.

10. A self-clocking demodulator for separating data and clock signals from a composite signal composed of a data block and a preamble preceding each said block, comprising:

means for generating a square wave output at a frequency approximately equal to the sum of the data plus clock signals, synchronizing means connected to said square wave generating means having as an input said composite signal for synchronizing said square wave output with said composite signal, flip-flop means coupled to said square wave generating means for generating a true and complement output at half the frequency of said square wave output, means for identifying said preamble and synchronizing said flip-flop with said composite data, and logic means responsive to said identifying means for combining said composite signal with said true and complement outputs to produce separate data and clock signals.

* * * * *